United States Patent [19]

Apgar

[11] 4,247,785

[45] Jan. 27, 1981

[54] FREEWAY POWER GENERATOR

[76] Inventor: James W. Apgar, 3529 Van Dyke, San Diego, Calif. 92105

[21] Appl. No.: 96,736

[22] Filed: Nov. 23, 1979

[51] Int. Cl.³ ............................................. H04R 23/00
[52] U.S. Cl. .................................. 290/1 R; 340/38 L
[58] Field of Search ...................... 193/35, 35 R, 35 B, 193/35 J, 35 A; 290/1 R, 1 C, 4 C, 45, 42, 43, 44, 53, 54, 55; 340/38 L

[56] References Cited

U.S. PATENT DOCUMENTS

| | | | |
|---|---|---|---|
| 2,656,528 | 10/1953 | Savino | 235/92 TC |
| 3,398,384 | 8/1968 | Piekarski | 340/38 L |
| 3,567,912 | 3/1971 | Neild | 340/38 L |
| 3,713,521 | 8/1971 | Moritake | 193/37 |
| 3,885,163 | 5/1975 | Toberman | 290/1 |

FOREIGN PATENT DOCUMENTS 2631404  1/1978  Fed. Rep. of Germany ........ 340/38 L
568064   8/1977  U.S.S.R.

Primary Examiner—J. V. Truhe
Assistant Examiner—Shelley Wade
Attorney, Agent, or Firm—Brown & Martin

[57] ABSTRACT

A series of magnetized cylindrical rollers are rotatably mounted in spaced transverse channels under a freeway off ramp. Each roller is made of non-magnetic material and has plurality of cavities around its rim in which arcuate bar magnets are mounted. The bar magnets are arranged with like poles adjacent each other to produce magnetic spokes which penetrate the off ramp and extend into the space traversed by vehicles travelling along the off ramp. Motion of the vehicles induces rotation of the magnetic rollers by magnetic interaction with the magnetic spokes. Electrical generators are coupled to the rollers to change their rotary motion into electrical energy.

10 Claims, 6 Drawing Figures

FREEWAY POWER GENERATOR

BACKGROUND OF THE INVENTION

This invention relates to a power generator for recovering energy in a useful form from automobiles and trucks which are leaving freeway off ramps. When automobiles and trucks approach a freeway off ramp they contain a large amount of kinetic energy. As they brake to slow down and perhaps stop at the off ramp, this energy is wasted by dissipation in the brake drums. The principal object of this invention is to provide means for converting a portion of this wasted energy into useful form.

One means for doing this which has been proposed in the past is disclosed in U.S. Pat. No. 3,885,163 which issued on May 20, 1975 to Charles E. Toberman. This patent proposes to mount a plurality of rollers in open trenches which are cut transversely across the freeway and to place the rollers so they will contact the tires of automobiles and trucks passing thereover and be rotated by frictional contact with the tires. Electrical generators are coupled to the shafts of the rollers and are rotated to change the rotational energy of the rollers into electrical energy.

This proposal has several drawbacks. In the first place, the hammering effect of repeated short periods of impact with fast moving vehicles would damage or destroy the bearings of the rollers in a short period of time. Secondly, the motorist would object to the repeated small bumps caused by the contact with the rollers. Thirdly, the open trenches would fill with water whenever it rains and thus would damage the bearings of the rollers.

SUMMARY OF THE INVENTION

This invention obviates the drawbacks of the prior art freeway power generator by mounting a series of magnetized rotary devices under the road. When automobiles or trucks, which are largely made of magnetic material, move across the magnetized rotary devices, they cause the rotary devices to rotate due to the magnetic interaction between the rotary devices and vehicles. Energy transducers such as electrical generators are coupled to the magnetized rotary devices to convert their rotational energy into a form of energy which can be transmitted to locations which are remote from the off ramp.

DESCRIPTION OF THE PREFERRED EMBODIMENT

Figure 3:
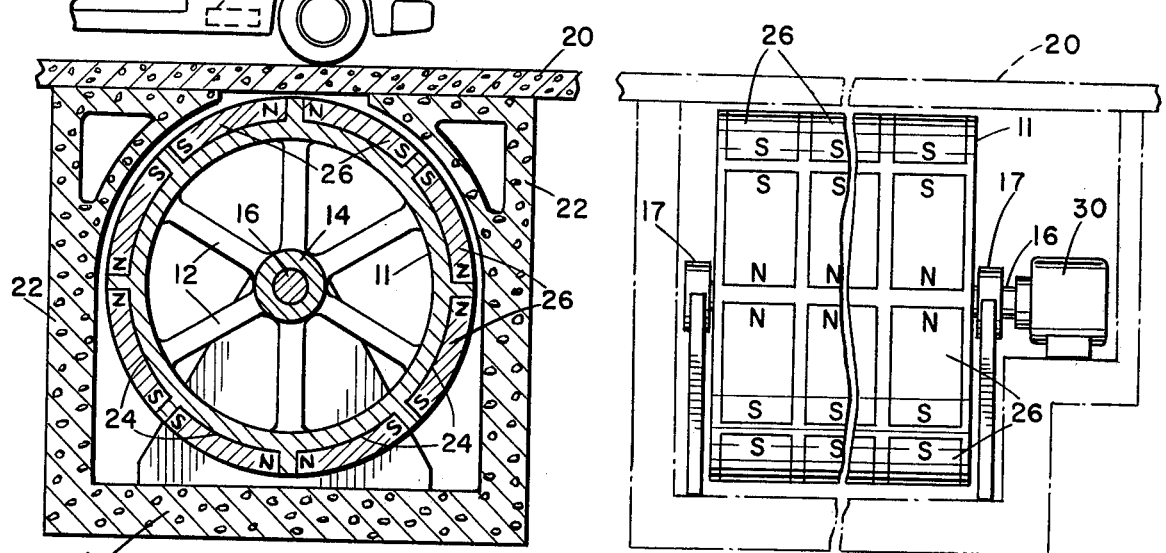
FIG. 3 is an enlarged cross sectional view of one of the magnetic rollers.
Figure 4:
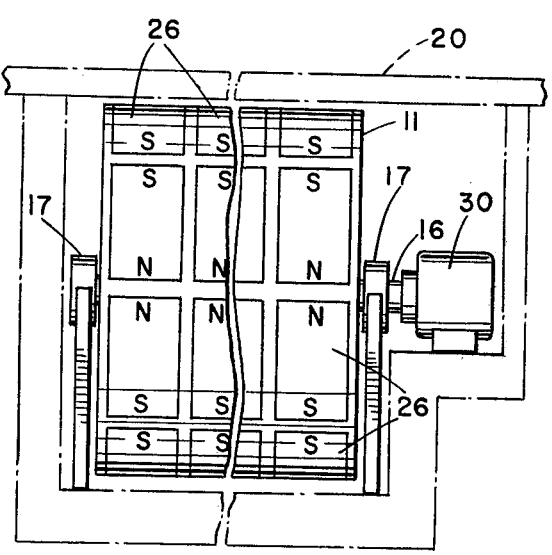
FIG. 4 is a side elevation view of the magnetized roller of FIG. 3, with the enclosure structure indicated in broken line.
Figure 6:
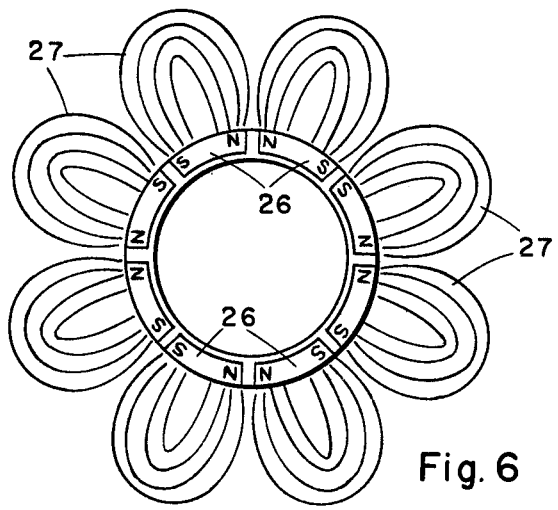
FIG. 6 is the distribution of magnetic flux around the roller.

FIGS. 3 and 4 show one of the magnetized rollers 10 and FIG. 6 shows the distribution of magnetic flux around the roller 10. Referring to FIGS. 3, 4, and 6, the roller 10 is made of a non-magnetic material such as aluminum and has a cylindrical outer shell 11 which is supported by spokes or vanes 12 which emanate from a hub 14. The hub 14 is rotatably supported by a shaft 16 which is journaled in conventional bearings 17. The roller 10 is seated in a channel 18 which is dug below the road 20 and which extends transversely across at least one lane of the road. The road 20 is supported in the neighborhood of roller 10 by arched supporting columns 22 which are made of non-magnetic, non-electrically conducted materials such as wood or fiber glass reinforced concrete.

The cylindrical shell 11 has a plurality of arcuate cavities 24 in its rim which contain arcuate bar magnets 26. The arcuate bar magnets 26 are arranged with like poles adjacent to each other so that their magnetic fields buck each other and tend to extend the fields outward as shown in FIG. 6 to create magnetic spokes 27 which extend through the concrete of roadway 20 into the space transversed by a vehicle 28 passing over the road. Note that an even number of arcuate bar magnets 26 are required around the periphery of the cylindrical shell 11 to create a bucking field all the way around the rim of the shell 11. An odd number of arcuate bar magnets around the periphery of the shell 11 produces one aiding field where unlike poles are adjacent to each other. When a vehicle 28 passes over the magnetic roller 10, it passes through the magnetic spokes 27 and the magnetic material in the vehicle interacts with the spokes 27 and causes distortion of their magnetic field which in turn, through the motion of the vehicle creates a turning moment on the roller 10 and causes it to rotate. The magnetic interaction causes the vehicle to slow down, but this is a desirable effect on an off ramp.

An energy transducer such as an electrical generator 30 is coupled to the magnetized roller 10 to change its rotary energy into a form of energy which can be transmitted to locations which are remote from the site of the roller 10. Any suitable form of energy transformation can be used, for example, instead of an electrical generator, a water pipe can be used in which the rotary movement of the magnetized roller is used to impart motion to the water in the pipe.

Figure 1:
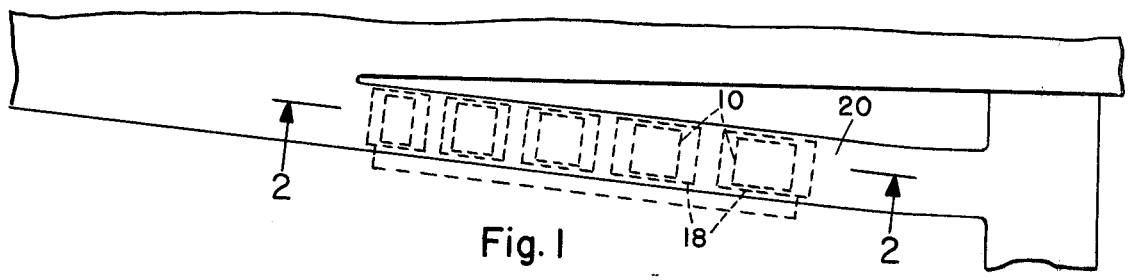
FIG. 1 is a plan view showing an off ramp having a series of progressively larger magnetized rollers installed in channels cut transversely under the off ramp.
Figure 2:
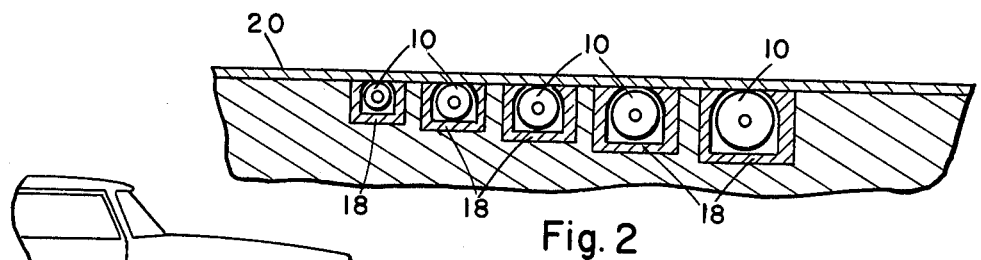
FIG. 2 is a longitudinal sectional view of the off ramp taken on line 2—2 of FIG. 1.
Figure 5:
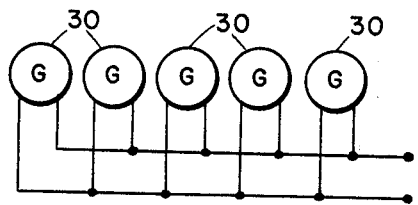
FIG. 5 shows the electrical connections for generators attached to the magnetized rollers.

FIGS. 1 and 2 show a typical application of the magnetized roller described above to a freeway off ramp. A spaced apart series of channels 18, each progressively larger in size, are dug under the off ramp and are spaced as shown in FIGS. 1 and 2. The smaller rollers 10, which turn at higher speed due to their lower moment of inertia, are located near the entrance to the off ramp at which point the vehicles are travelling at the highest speed. The rollers 10 are progressively larger along the off ramp to take into account the fact that the vehicles slow down during passage along the off ramp to a stop at the end where the off ramp joins a side street. The generators 30 which are coupled to the magnetized rollers 10 are preferably coupled in parallel as shown in FIG. 5.

To enhance the action of the invention, a magnet 32 may be mounted in the body of the vehicles passing over roller 10. This can be either a permanent magnet or an electromagnet which only turns on when the brakes are applied.

This invention contemplates the installation of magnetized rollers on all of the off ramps of the freeway systems and it is believed that an appreciable amount of electrical power can be generated in this manner due to the large volume of traffic that is carried by the freeways. The invention is also applicable to railroads, and in this connection it should be noted that the word "road" as used in the claims is intended to include railroads and the word "vehicle" as used in the claims is intended to include railroad trains.

I claim:

1. A power generator for converting the motion of vehicles over a road into useful energy comprising:
   at least one transverse channel under said road extending across at least one lane of said road;
   a magnetized rotary device in said channel, said magnetized rotary device being positioned with its rotary axis transverse to the road and extending across at least one lane of said road; and
   energy transducer means coupled to said magnetized rotary device for changing its rotational energy into a form of energy that can be transmitted to locations that are remote from said road,
   whereby the motion of vehicles over said magnetized rotary device causes it to rotate and to generate useful energy.

2. A power generator defined in claim 1 wherein said energy transducer means is an electrical generator.

3. The power generator defined in claim 1 wherein said magnetized rotary device is a cylindrical roller made of non-magnetic material, there being a plurality of arcuate cavities in the rim of said cylindrical roller, and a plurality of arcuate bar magnets in said cavities.

4. The power generator defined in claim 3 wherein said arcuate bar magnets are arranged with like poles adjacent to each other to create spokes of magnetic flux which extend outwardly from said cylindrical roller.

5. The power generator defined in claim 4 wherein there is an even number of arcuate bar magnets on said cylindrical roller so that every magnetic pole will be adjacent to like magnetic poles.

6. A freeway off ramp power generator comprising:
   a plurality of transverse channels under said off ramp, each of said channels extending transversely completely across said off ramp;
   a magnetized rotary device in each channel, said magnetized rotary device being positioned with its rotary axis transverse to the off ramp and extending completely across the off ramp; and
   energy transducer means coupled to each magnetized rotary device for changing its rotational energy into a form of energy that can be transmitted to locations that are remote from said off ramp, whereby the motion of vehicles over each magnetized rotary device causes it to rotate to generate useful energy.

7. The power generator defined in claim 6 wherein each of said magnetized rotary devices is a cylindrical roller made of non-magnetic material, there being a plurality of arcuate cavities in the rim of said cylindrical roller, and a plurality of arcuate bar magnets in said cavities, and the dimension of each of said rollers being different, the smallest of said rollers being positioned near the entrance to the off ramp and the largest being positioned at the exit of the off ramp and the sizes of the rollers being progressively larger from the smallest to the largest.

8. The power generator defined in claim 6 whereby each energy transducer is an electrical generator.

9. The power generator defined in claim 7 wherein said arcuate bar magnets are arranged with like poles adjacent to each other to create spokes of magnetic flux which extend outwardly from each cylindrical roller.

10. The power generator defined in claim 9 wherein there is an even number of arcuate bar magnets on each cylindrical roller so that every magnetic pole will be adjacent to like magnetic poles.

* * * * *